(12) United States Patent
Philbrick et al.

(10) Patent No.: US 11,803,423 B1
(45) Date of Patent: *Oct. 31, 2023

(54) DYNAMIC ALLOCATION OF RESOURCES

(71) Applicant: UIPCO, LLC, San Antonio, TX (US)

(72) Inventors: Ashley Raine Philbrick, San Antonio, TX (US); Ryan Thomas Russell, The Colony, TX (US); Nathan Lee Post, Rockport, TX (US); Brian J. Osterkamp, New Braunfels, TX (US); William Preston Culbertson, II, Plant City, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,861

(22) Filed: May 18, 2022

Related U.S. Application Data

(63) Continuation of application No. 16/587,315, filed on Sep. 30, 2019, now Pat. No. 11,366,702.

(60) Provisional application No. 62/825,973, filed on Mar. 29, 2019.

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 9/5016* (2013.01); *G06F 9/5027* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,005,950 B1* | 8/2011 | Ashcraft | G06F 9/44505 709/224 |
| 8,930,948 B2* | 1/2015 | Shanmuganathan | G06F 9/5016 718/1 |
| 9,135,126 B2* | 9/2015 | Heyrman | G06F 11/1402 |
| 9,348,654 B2* | 5/2016 | Anderson | G06F 9/4843 |
| 9,983,908 B1* | 5/2018 | Cropper | G06F 9/45558 |
| 10,176,550 B1* | 1/2019 | Baggerman | G06T 1/60 |

(Continued)

*Primary Examiner* — Hiren P Patel
(74) *Attorney, Agent, or Firm* — Plumsea Law Group, LLC

(57) ABSTRACT

A method for dynamically allocating computing resources to virtual computing machines in a shared system. An initial allocation is made for each computing resource. Current demand for each computing resource for each of the virtual computing machines is determined to identify changes in current demand. The system identifies a virtual computing machine for which usage of a first computing resource is approaching a first predetermined threshold allotted to the first virtual computing machine. The system identifies a second virtual computing machine in the system for which usage of the first computing resource is less than a second predetermined threshold of the first computing resource allotted to the second virtual computing machine. The server dynamically allocates at least part of the first computing resource from the second virtual computing machine to the first virtual computing machine to meet current demand for the first computing resource in the first virtual computing machine.

20 Claims, 9 Drawing Sheets

(56) References Cited

U.S. PATENT DOCUMENTS

| | | | |
|---|---|---|---|
| 10,241,836 B2* | 3/2019 | Bai | G06F 9/5022 |
| 10,613,606 B2* | 4/2020 | Min | G06F 1/3206 |
| 10,963,311 B2* | 3/2021 | Walsh | G06F 9/5016 |
| 10,994,198 B1* | 5/2021 | Byskal | G06F 9/50 |
| 10,997,113 B1* | 5/2021 | Reineke | G06F 9/45558 |
| 11,249,790 B1* | 2/2022 | Gupta | G06F 9/5077 |
| 11,366,702 B1* | 6/2022 | Philbrick | G06F 9/5016 |
| 2005/0132362 A1* | 6/2005 | Knauerhase | G06F 9/45533 718/1 |
| 2009/0307686 A1* | 12/2009 | Hepkin | G06F 9/45558 718/1 |
| 2013/0263117 A1* | 10/2013 | Konik | G06F 9/45558 718/1 |
| 2014/0007097 A1* | 1/2014 | Chin | G06F 9/5077 718/1 |
| 2014/0359356 A1* | 12/2014 | Aoki | G06F 11/3062 714/24 |
| 2014/0373010 A1* | 12/2014 | Folco | G06F 9/45533 718/1 |
| 2015/0106520 A1* | 4/2015 | Breitgand | H04L 67/101 709/226 |
| 2015/0178127 A1* | 6/2015 | Karunamoorthy | G06F 9/45558 718/1 |
| 2016/0055025 A1* | 2/2016 | Jul | G06F 9/5083 718/1 |
| 2017/0153906 A1* | 6/2017 | Bektas | G06F 9/45558 |
| 2017/0269668 A1* | 9/2017 | Min | G06F 9/45558 |
| 2018/0018197 A1* | 1/2018 | Liu | G06F 9/45558 |
| 2018/0088997 A1* | 3/2018 | Min | G06F 11/301 |
| 2018/0157510 A1* | 6/2018 | Triplett | G06F 9/45558 |

\* cited by examiner

DYNAMIC ALLOCATION OF RESOURCES

CROSS-REFERENCE TO RELATED APPLICATIONS

This application is a Continuation of Philbrick et al., U.S. Pat. No. 11,366,702, issued on Jun. 21, 2022, and titled "Dynamic Allocation of Resources," which claims the benefit of U.S. Provisional Patent Application Ser. No. 62/825,973, filed Mar. 29, 2019, titled "Dynamic Allocation of Resources." All of disclosures above are hereby incorporated by reference in their entirety.

BACKGROUND OF THE INVENTION

1. Field of the Invention

The present invention relates to dynamic allocation of computer resources. In particular, the invention relates to dynamical allocation of resources in a shared system of virtual computing machines.

2. Description of Related Art

Computing machines are available in a variety of configurations. For example, personal computers are designed to be used by one user. Personal computers may be configured to emphasize computing power, memory, or storage, depending upon the interests of the user and the intended uses.

Whereas a personal computer may be convenient for a user, providing a personal computer to each employee of a business may become costly as costs for individuals individual licenses for software may be required. Administrative tasks required to monitor and administer such licenses for individual computers owned by the company and loaned to individuals may be significant. Further, security may be an issue, as individual computers may be stolen or lost.

Individual computers given to employees of companies are subject to the same costs, failures, and risks. Thus, an enterprise may prefer to utilize a central computing system. Using a central computing system increases security both for the individual and for the business. However, central computing systems may increase downtime if a server must be removed from service to re-configure an individual user's machine when the user's needs change. Downtime also may increase if security on the server is compromised, and each of the users of the server must be inconvenienced by the interruption of service.

Thus, there is a need in the art for a system and method that addresses the shortcomings of the prior art discussed above.

SUMMARY OF THE DISCLOSURE

In one aspect, the disclosure is directed to a method for dynamically allocating computing resources to plural virtual computing machines in a shared system. The computing resources include processing resources, memory resources, and storage resources. In accordance with the method, an initial allocation is made for each computing resource for each virtual computing machine. The system monitors a current demand for each computing resource for each of the plurality of virtual computing machines to identify changes in the current demand.

The system then identifies a first virtual computing machine of the plurality of virtual computing machines for which usage of a first computing resource is approaching a first predetermined threshold of the first computing resource allotted to the first virtual computing machine. The system then dynamically allocates unused first computing resource to the first virtual computing machine to satisfy the current demand for the first computing resource.

In another aspect, the disclosure is directed to a method for dynamically allocating computing resources to plural virtual computing machines in a shared system. Computing resources includes processing resources, memory resources, and storage resources.

In accordance with this aspect of the disclosure, the system determines an initial allocation for each computing resource for each virtual computing machine. The system monitors a current demand for each computing resource for each one of a plurality of virtual computing machines to identify changes in the current demand. The system identifies a first virtual computing machine of the plurality of virtual computing machines for which usage of a first computing resource is approaching a first predetermined threshold of the first computing resource allotted to the first virtual computing machine. The system also identifies a second virtual computing machine of the plurality of virtual computing machines for which usage of the first computing resource is less than a second predetermined threshold of the first computing resource allotted to the second virtual computing machine.

The server then makes a dynamic allocation of at least part of the first computing resource from the second virtual computing machine to the first virtual computing machine to meet the current demand for the first computing resource in the first virtual computing machine.

In still another aspect, the disclosure is directed to a shared system for plural virtual computing machines. The system includes a plurality of virtual computing machines including computing resources. Each computing resource includes a processing resource, a memory resource, and a storage resource, and each computing resource for each virtual computing machine has an initial allocation. The system monitors a current demand for each computing resource for each one of a plurality of virtual computing machines in the system to identify changes in the current demand.

A first virtual computing machine of the plurality of virtual computing machines has usage of a first computing resource that approaches a first predetermined threshold of the first computing resource allotted to the first virtual computing machine.

The system identifies a second virtual computing machine of the plurality of virtual computing machines for which usage of the first computing resource is less than a second predetermined threshold of the first computing resource allotted to the second virtual computing machine. The system dynamically allocates a fraction of the first computing resource from the second virtual computing machine to the first virtual computing machine to meet the current demand for the first computing resource for the first machine.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

In one aspect, the disclosure is directed to a method for dynamically allocating computing resources to plural virtual computing machines in a shared system. The computing resources include processing resources, memory resources, and storage resources. In accordance with the method, an initial allocation is made for each computing resource for each virtual computing machine. The system monitors a current demand for each computing resource for each of the plurality of virtual computing machines to identify changes in the current demand.

The system then identifies a first virtual computing machine of the plurality of virtual computing machines for which usage of a first computing resource is approaching a first predetermined threshold of the first computing resource allotted to the first virtual computing machine. The system then dynamically allocates unused first computing resource to the first virtual computing machine to satisfy the current demand for the first computing resource.

Figure 9:
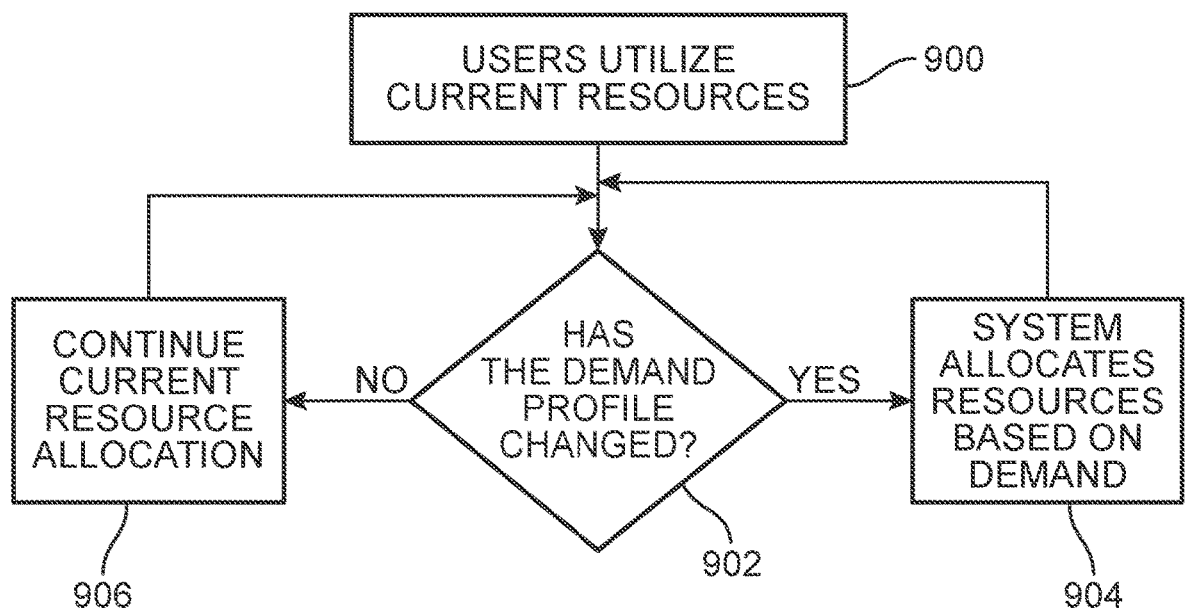
FIG. 9 is a schematic diagram of a process embodiment of the disclosure.

FIG. 9 is a schematic diagram of this embodiment of the disclosure. A shared system 900 includes plural virtual computing machines. Any number of virtual computing machines may form shared system 900. Any number of the virtual computing machines may be actively in use, with the remainder of the virtual computing machines not in use. In system 900, users utilize current resources, i.e., resources assigned to them, or an initial allocation of resources.

The system continues to monitor or check usage by each virtual computing machine of each of the computing resources, i.e., processing resources, memory resources, and storage resources, at 902. The system compares the new profile to the old profile and determines whether the demand has changed.

If demand has changed, the system follows an embodiment to the "YES" arrow to 904. Because demand has changed, the system allocates resources to meet that new demand. For example, if a first virtual computing machine is using a computing resource at a first predetermined threshold, the system will allocate additional computing resource to the first virtual computing machine. Typically, these additional resources will come from a virtual computing machine or plural virtual computing machines that are underutilized or unused. Typically, unused virtual machine resources are selected for contribution to the computing resource of the first virtual computing machine. In this way, there is no risk of disturbing other virtual computing machine users.

After allocation of computing resource based on the new demand, the system returns the analysis of demand from the reallocation step 904 to the decision point 902 and again determines whether the demand profile has changed.

In another embodiment, the determination at 902 of whether demand has changed from the initial allocation yields a negative answer. In that embodiment, there is no need to adjust any allocations at 906. However, the system continues to monitor demand at 902. The monitoring step may be carried out as frequently as is warranted by usage rate, demand, number of users, and the like. In another embodiment, system monitoring may occur continually, to ensure that any changes that are required are made as quickly as possible.

Figure 1:
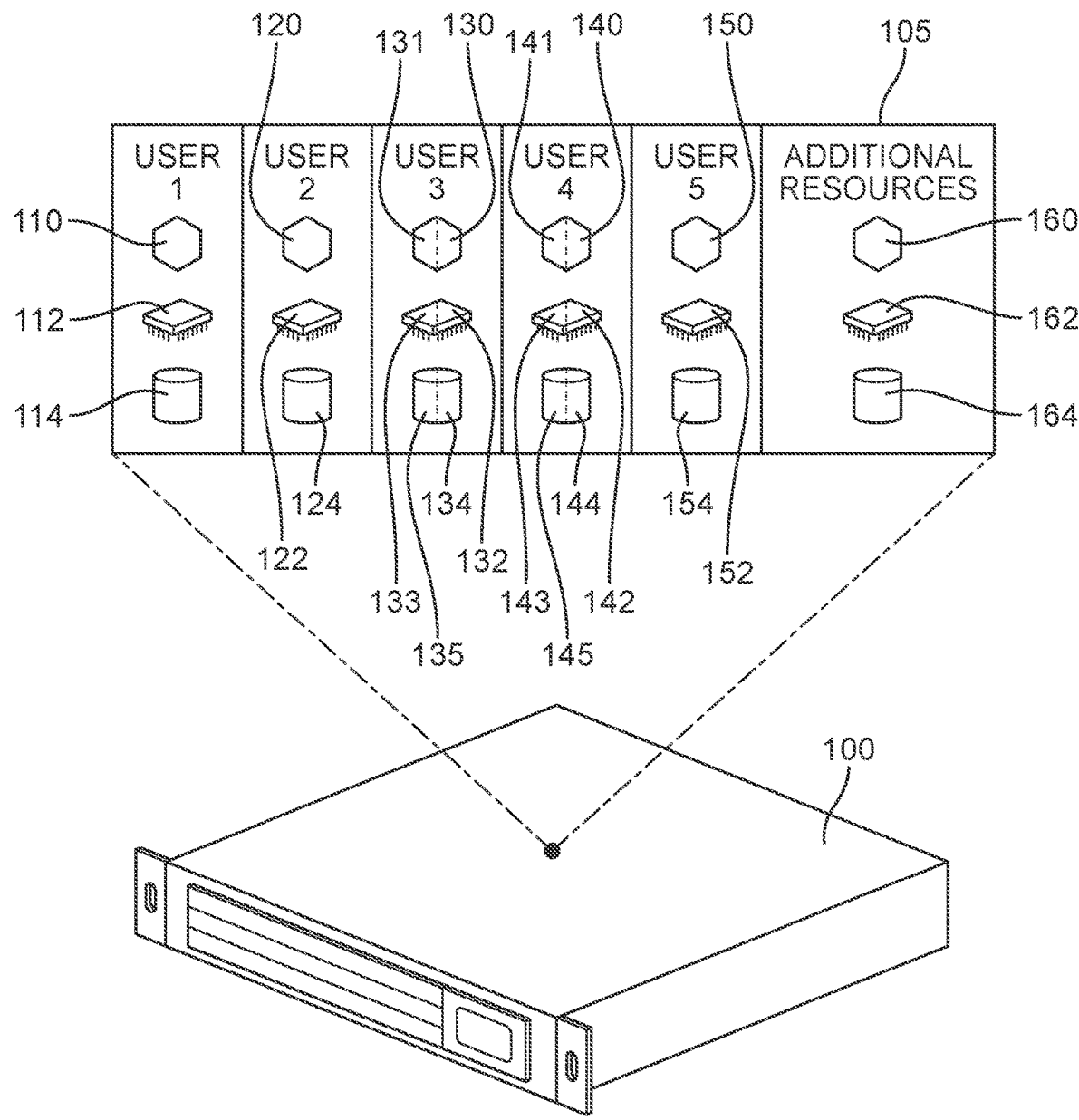
FIG. 1 is a schematic diagram of a server of the disclosure.

FIG. 1 illustrates an embodiment of a system in accordance with the disclosure. System 100 includes virtual computing machines allocated to individual users and additional resources 105 assigned to sixth virtual computing machine 300 (see FIG. 3) but not now allocated to an identified user. FIG. 1 illustrates first virtual computing machine 210, second virtual computing machine 215, third virtual computing machine 220, fourth virtual computing machine 225, and fifth virtual computing machine 230.

Figure 2:
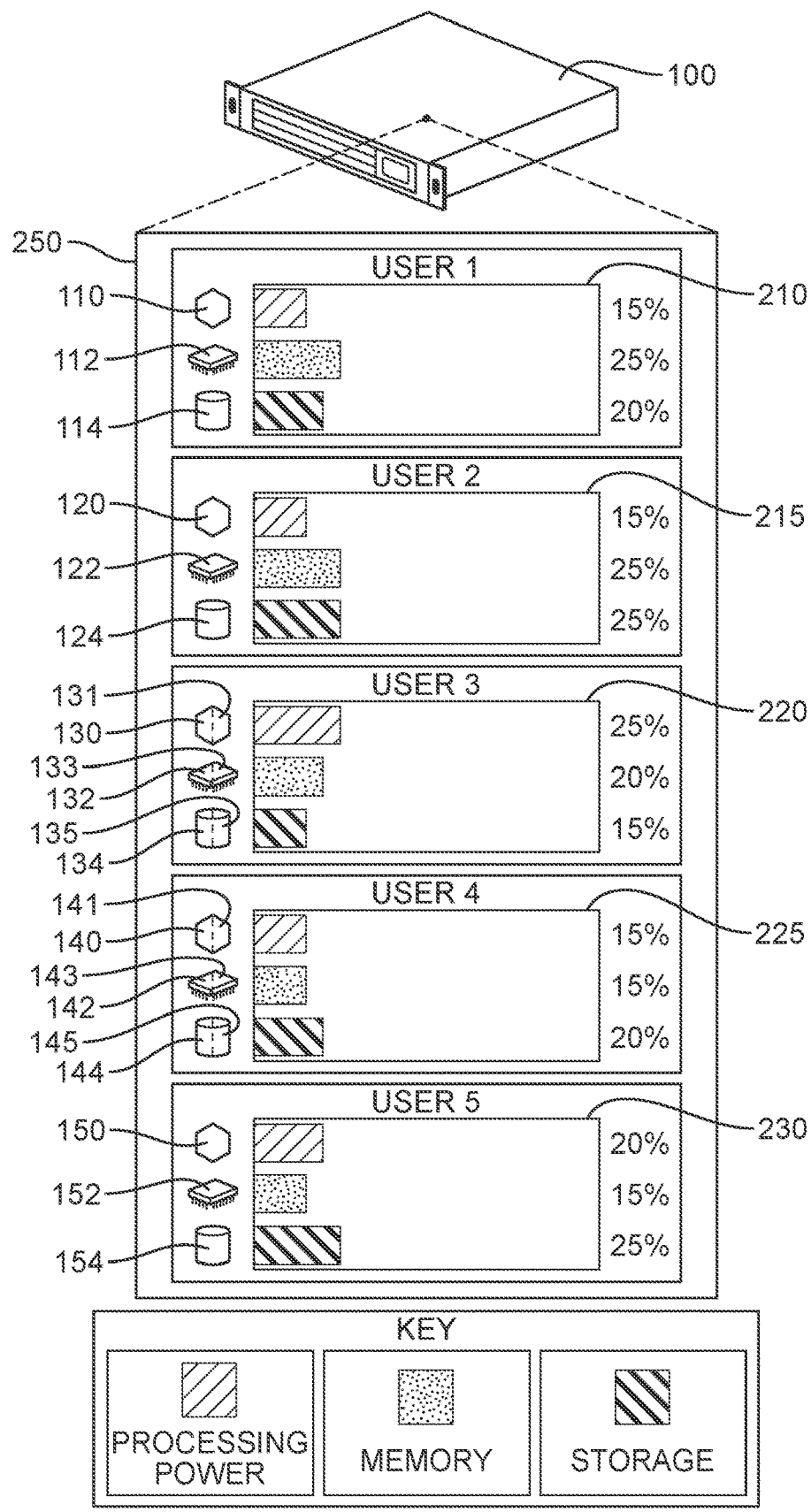
FIG. 2 is a schematic diagram of operation of a server of the disclosure.

In embodiments, each virtual computing machine includes a processing resource, also known as a processor core, having processing power; a memory, also known as a memory resource, having memory for the virtual computing machine; and storage, also known as a storage resource, for storage by a virtual computing machine. Thus, as can be seen in FIG. 2, first processor core 110 is found in virtual computing machine 210; second processor core 120 is found in virtual computing machine 215; third processing core 130 and fourth processing core 131 are found in virtual computing machine 220; fifth processing core 140 and sixth processing core 141 are found in virtual computing machine 225; seventh processor core 150 is found in virtual computing machine 230; and eighth processor core 160 is available in virtual computing machine 300. Further, as can be seen in FIG. 1, first memory resource 112 is found in virtual computing machine 210; second memory resource 122 is found in virtual computing machine 215; third memory resource 132 and fourth memory resource 133 are found in virtual computing machine 220; fifth memory resource 142 and sixth memory resource 143 found in virtual computing machine 225; and seventh memory resource 152 is found in virtual computing machine 230. Virtual computing machine 300 includes eighth memory resource 162.

As also can be seen in FIG. 1, in these embodiments, first storage resource 114 is found in virtual computing machine 210; second storage resource 124 is found in virtual computing machine 215; third storage resource 134 and fourth storage resource 135 are found in virtual computing machine 220; fifth storage resource 144 and sixth storage resource 145 are found in virtual computing machine 225; seventh storage resource 154 is found in virtual computing machine 230; and virtual computing machine 300 includes eighth storage resource 164.

The value, capacity, speed, or any other property or characteristic of each computing resource herein that is measured to establish a performance expectation for that resource, may have any value. For example, the speed of the processing core may be the same or different for each virtual computing machine in a system. In embodiments of the disclosure, any feature may be divided into as many fractions as the system requires to operate efficiently. Just as the number of fractions may be selected, these fractions may be conformed to allocate sufficient system resources to each virtual computing machine, as determined appropriate by the system.

In embodiments, each feature of a type may have the same capacity. For example, first memory resource 112 may have the same capacity as second memory resource 122, third memory resource 132, fourth memory resource 142, and fifth memory resource 152, and additional memory resource 162. In other embodiments, each feature of a type may have a different capacity. For example, first storage resource 114 may have a different capacity from second storage resource 124. Third storage resource 134 may have a different capacity from fourth storage resource 144. For convenience and ease of description herein, the processing cores all have the same properties and characteristics, the memory resources all have the same capacity, and the storage resources all have the same capacity.

Similarly, in embodiments of the invention, fractional features may be identical, or may be different. For example, in some embodiments, memory resource 134 and memory resources 135 may form equal halves of the storage resource of the virtual computing machine 220. In other embodiments, memory resources 134 may include twice the storage capacity of memory resources 135 of the storage resource of virtual computing machine 220. However, these resources will be described as having equal capacities in this disclosure, with the understanding that this is merely a matter of convenience and ease of description.

FIG. 2 illustrates a system operation in which each user's needs are met by the initial allocation. For USER1, the percentages of the initial allocation of processing core 110, memory resource 112, and storage resource 114 are illustrated at the right edge of virtual computing machine 210. Use of processing core 110 is 15 percent of allocation, use of memory resource 112 is 25 percent of allocation, and use of storage resource 114 is 20 percent of allocation for USER1. Similarly, percentage use of processing core 120 in virtual computing machine USER2 as virtual computing machine 215 is 15 percent, use of memory resource is 25 percent, and use of storage resource is 25 percent. As can be seen, the greatest percentage use for any of USER3/virtual computing machine 220, USER4/virtual computing machine 225, and USER5/virtual computing machine 230, is 25 percent. In this embodiment, there is no need to make any additional allocation of system resources.

In another embodiment, the initial allocation becomes insufficient for at least one virtual computing machine. This insufficiency is caused by a change in the demand profile, as the initial allocation had been sufficient. Thus, in FIG. 9, the answer to the question in decision box 902, "Has the demand profile changed?", now is yes. Thus, the next step becomes "System allocates resources based on demand," as set forth in step 904. Thus, the system reallocates resources based on the change in demand and seeks to satisfy the demand of a virtual computing machine that has insufficient assets.

Thus, in this other aspect, the disclosure is directed to a method for dynamically allocating computing resources to plural virtual computing machines in a shared system. In accordance with this aspect of the disclosure, the system determines an initial allocation for each computing resource for each virtual computing machine. The system monitors a current demand for each computing resource for each one of a plurality of virtual computing machines to identify changes in the current demand. The system identifies a first virtual computing machine of the plurality of virtual computing machines for which usage of a first computing resource is approaching a first predetermined threshold of the first computing resource allotted to the first virtual computing machine. The system also identifies a second virtual computing machine of the plurality of virtual computing machines for which usage of the first computing resource is less than a second predetermined threshold of the first computing resource allotted to the second virtual computing machine.

The server then makes a dynamic allocation of at least part of the first computing resource from the second virtual computing machine to the first virtual computing machine to meet the current demand for the first computing resource in the first virtual computing machine.

In this embodiment, the system determines which user needs an additional allocation of at least one computing resource based on the fraction of the current allocation of the relevant computing resource. In accordance with these embodiments, a first predetermined threshold of each computing resource has been established to provide continual operation of a computing resource. For example, therefore, the first predetermined threshold for a first processing core may be about 70 percent, typically about 75 percent, and more typically about 80 percent. An example of a first predetermined threshold for a second processing core that is larger than the first processing core may be greater than the first predetermined threshold for the first processing core because a given percentage of processing ability is larger for a larger processing core. Thus, for a second processing core, the first predetermined threshold may be 75 percent, typically 80 percent, and more typically 85 percent. Similarly, for a third, smaller processing core, the first predetermined threshold may be 65 percent, typically 70 percent, and more typically 75 percent.

A first predetermined threshold for a memory resource and a first predetermined threshold for a storage resource also are established in a similar manner to ensure smooth, continuous operation of the virtual computing machine and of the system. The predetermined threshold values are chosen by the operator of the system.

The system also utilizes a second predetermined threshold to aid in identifying a second system. This second predetermined threshold for each computing resource is established in accordance with the capability of the system.

In embodiments, the system further determines which other virtual computing machine has an excess of the resource needed. The system also typically must determine whether that excess unused computing resource is sufficient to handle the shortfall while maintaining operation of that machine. Thus, the second predetermined threshold for a computing resource may be about 25 percent, typically at least about 20 percent, and more typically at least about 15 percent.

In embodiments, the system typically is biased to first determine whether any unused resource is available and whether that virtual computing machine's capacities are sufficient to satisfy the entire need of the resource or resources. If the capacities of the second virtual computing machine are sufficient, the system engages the additional resources and shifts them to the virtual computing machine that has reached the predetermined threshold.

Figure 3:
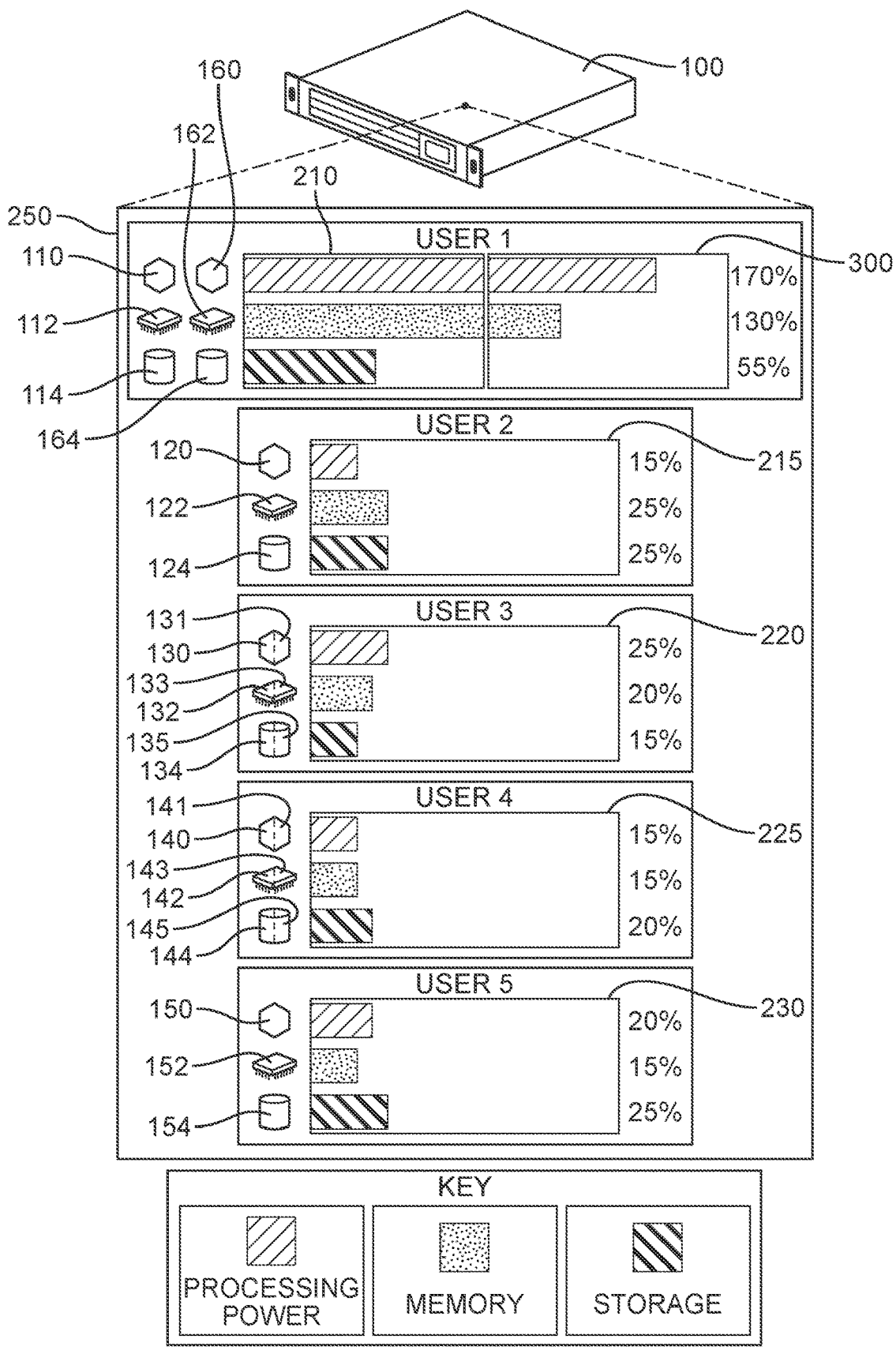
FIG. 3 is a schematic diagram of an embodiment of the disclosure.

In an embodiment illustrated in FIG. 3, second virtual computing machine 215, third virtual computing machine 220, fourth virtual computing machine 225, and fifth virtual computing machine 230 are operating well within their respective capacities for processing core, memory resource, and storage resource. Indeed, no use exceeds 25 percent of capacity. However, in the embodiment of FIG. 3, USER1 clearly has exceeded a first predetermined threshold for computing resource, as demand illustrated in virtual computing machine 210 is at 100 percent of processing core 110. Similarly, USER1 clearly has exceeded a first predetermined threshold for memory resource, by requiring 100 percent of the capacity of memory resource 112 in virtual computing machine 210.

In this embodiment, the system will assign additional processing core and additional memory resource, in accordance with step 904 of the process illustrated in FIG. 9, but will continue the current resource allocation for storage resource in accordance with step 906. Thus, when processing core and memory resource are accommodated, no changes need be made to storage resource in this embodiment. However, if the system accommodates the larger needs of processing core and memory resource by assigning a virtual computing machine, additional unused storage resource may become available to USER1.

In this embodiment, the system determines that virtual computing machine 300 can provide the system resources needed by USER1. For example, as can be seen in virtual computing machine 210, processing core 110 cannot provide 170 percent of processing core requirement, i.e., 170 percent of percent 110 capacity. The system determines that virtual computing machine 300 can provide the required 70 percent of processing core 110 capacity with processing core 160. Thus, processing may continue unhindered by the inadequacy of processing core 110 alone.

In this embodiment, the system also determines that memory resource 112 is inadequate to satisfy the requirement that is 130 percent of the capacity of memory resource 112. Therefore, the system associates memory resource 162 from virtual computing machine 300 with memory resource 112 of virtual computing machine 210 to completely satisfy the needs of USER1.

Figure 4:
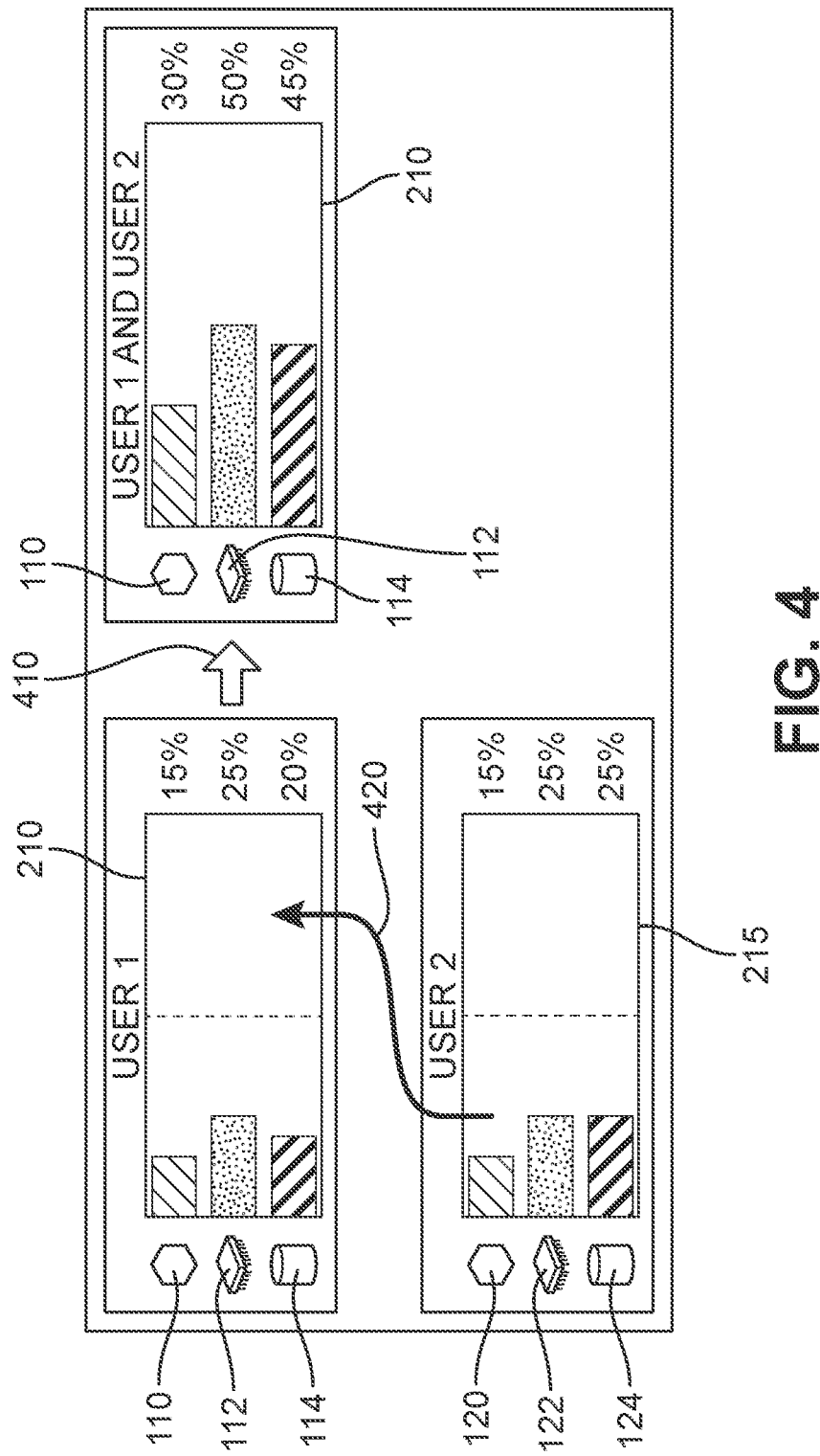
FIG. 4, FIG. 5, and FIG. 6 are schematic diagrams of steps of an embodiment of the disclosure.
Figure 5:
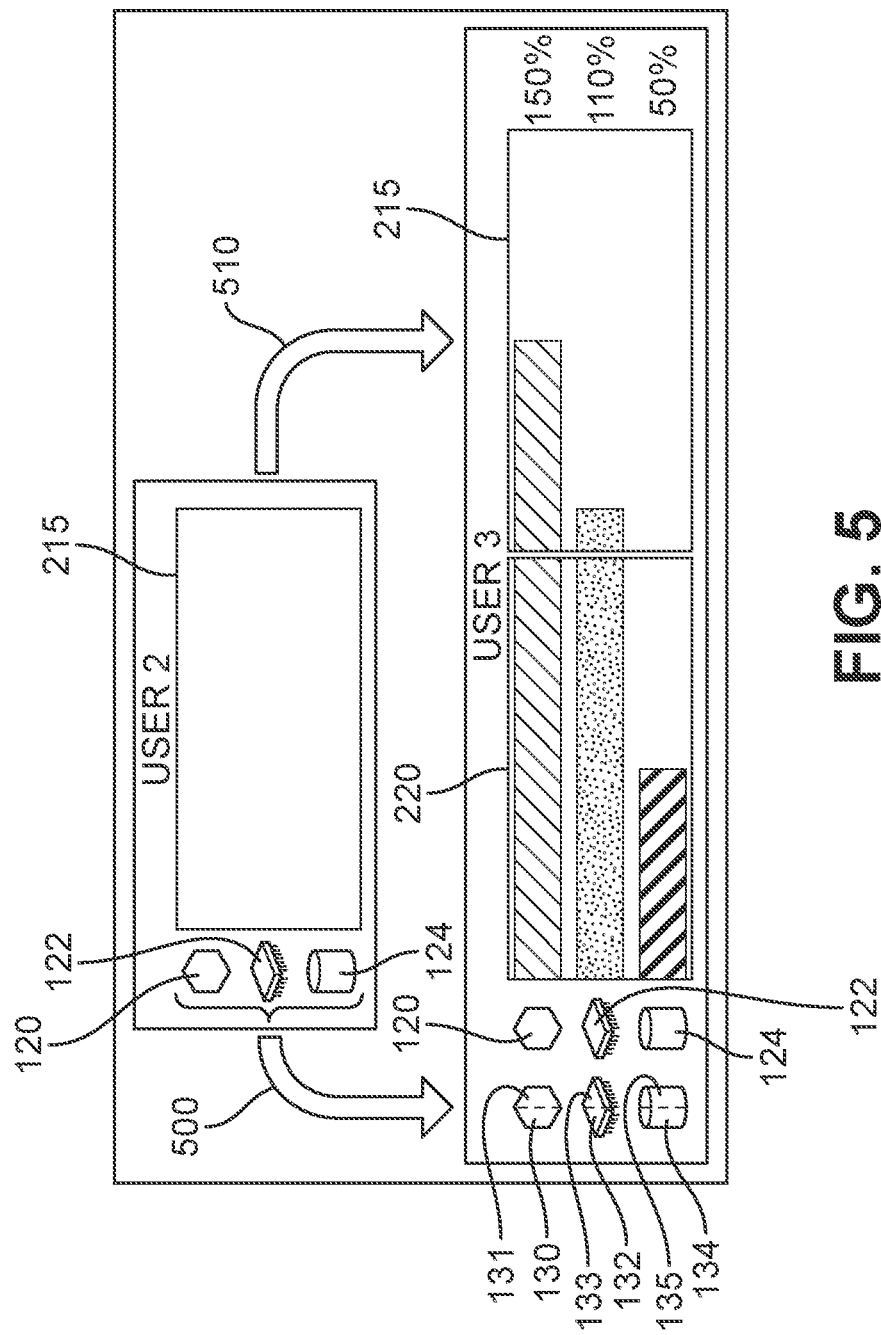
Figure 6:
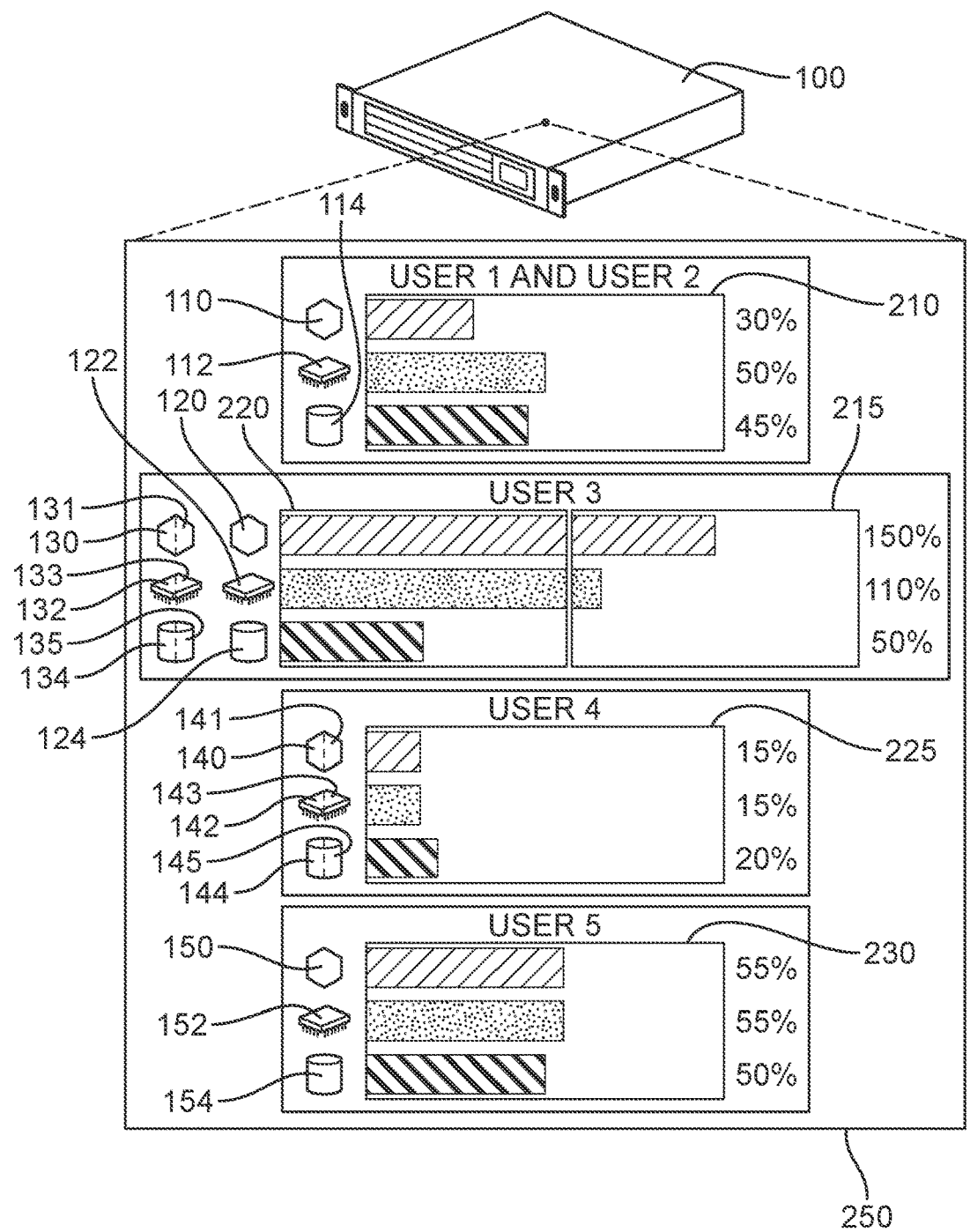
Figure 6:
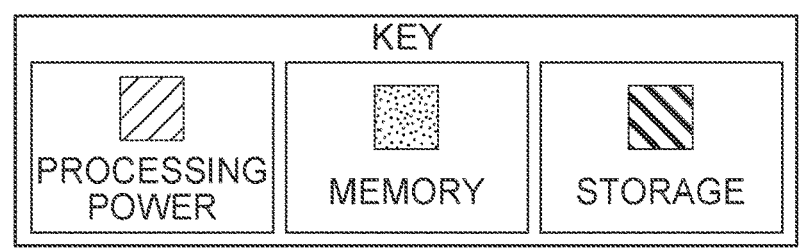

FIG. 4, FIG. 5, and FIG. 6 illustrate another solution for accommodating the needs of one virtual computing machine. FIG. 4 and FIG. 5 represent parts of system 100 illustrated in FIG. 6. As can be seen on FIG. 5, in this embodiment of the disclosure, USER1 and USER2 are used in combination to meet the needs of USER3.

As shown in FIG. 4, USER1 on virtual computing machine 210 is using 15 percent of processing core 110, 25 percent of memory resource, and 20 percent of storage resource. In accordance with these embodiments, USER1 may suitably continue operation without disturbance if a portion of the capacities of processing core 110, memory resource 112, and storage resource 114, because the usage of each is less than about 25 percent, the second predetermined threshold for this system.

Similarly, USER2 on virtual computing machine 215 may suitably continue operation without disturbance if parts of its capacities are removed. As USER2 is using 25 percent or less of the capacities of computing resource 120, memory resource 122, and storage resource 124, a fraction of these assets can be dynamically allocated to another virtual computing machine.

As illustrated on FIG. 4, the system may choose to consolidate the operation of virtual computing machine 215 with virtual computing machine 210. To achieve this result, in this embodiment, the entire content of virtual computing machine 215 is dynamically allocated to virtual computing machine 210, as illustrated by transfer arrow 420. USER1 and USER2 are combined onto virtual computing machine 210, as illustrated by arrow 410. As the two virtual computing machines were experiencing only light usage, both can be accommodated on the same processing core 110, memory resource 112, and storage resource 114.

FIG. 5 illustrates that virtual computing machine 215 now is empty and available for assignment to aid another virtual computing machine. The assets from virtual computing machine 215 now can be made available to USER3 and dynamically allocated to virtual computing machine 215, which has a usage exceeding the first predetermined threshold of 75 percent. In combination, virtual computing machine 220 and virtual computing machine 215 can function together to meet the processing and memory requirements of USER3.

As can be seen at the left side of FIG. 5, processing core 130 and processing core 131 from virtual computing machine 220 are dynamically allocated to processing core 120 from virtual computing machine 215. Similarly, memory resource 132 and memory resource 133 from virtual computing machine 220 are dynamically allocated to memory resource 122 from virtual computing machine 215, and storage resource 134 and storage resource 135 from virtual computing machine 220 are dynamically allocated to storage resource 124 from virtual computing machine 215. These movements and associations are illustrated symbolically by movement arrow 500. Processing core 130 and processing core 131 from virtual computing machine 220 and processing core 120 from virtual computing machine 220 combine to provide processing resource at 150 percent of the capacity of processing core 130.

Movement arrow 510 at the right end of FIG. 5 further illustrates symbolically that virtual computing machine 215 has been dynamically allocated to virtual computing machine 220. The right side of FIG. 5 also further illustrates that the combination of memory resource 132 and memory resource 122 to accommodate a memory demand of 110 percent of the memory resource 132 of virtual computing machine 220.

FIG. 6 illustrates the complete system 100 that is shown partially on FIG. 4 and FIG. 5. FIG. 4 illustrates transition from virtual computing machine 210 to a combination of virtual computing machine 210 and virtual computing machine 215. Similarly, FIG. 5 illustrates migration of the assets or capabilities of virtual computing machine 215 to virtual computing machine 215, providing USER3 with sufficient resources to continue with heavy use.

FIG. 6 illustrates the entirety of system 100, illustrating that virtual computing machine 225 and virtual computing machine 230 remain unchanged, as these virtual computing machines can accommodate the demands of each user resident thereon.

Figure 7:
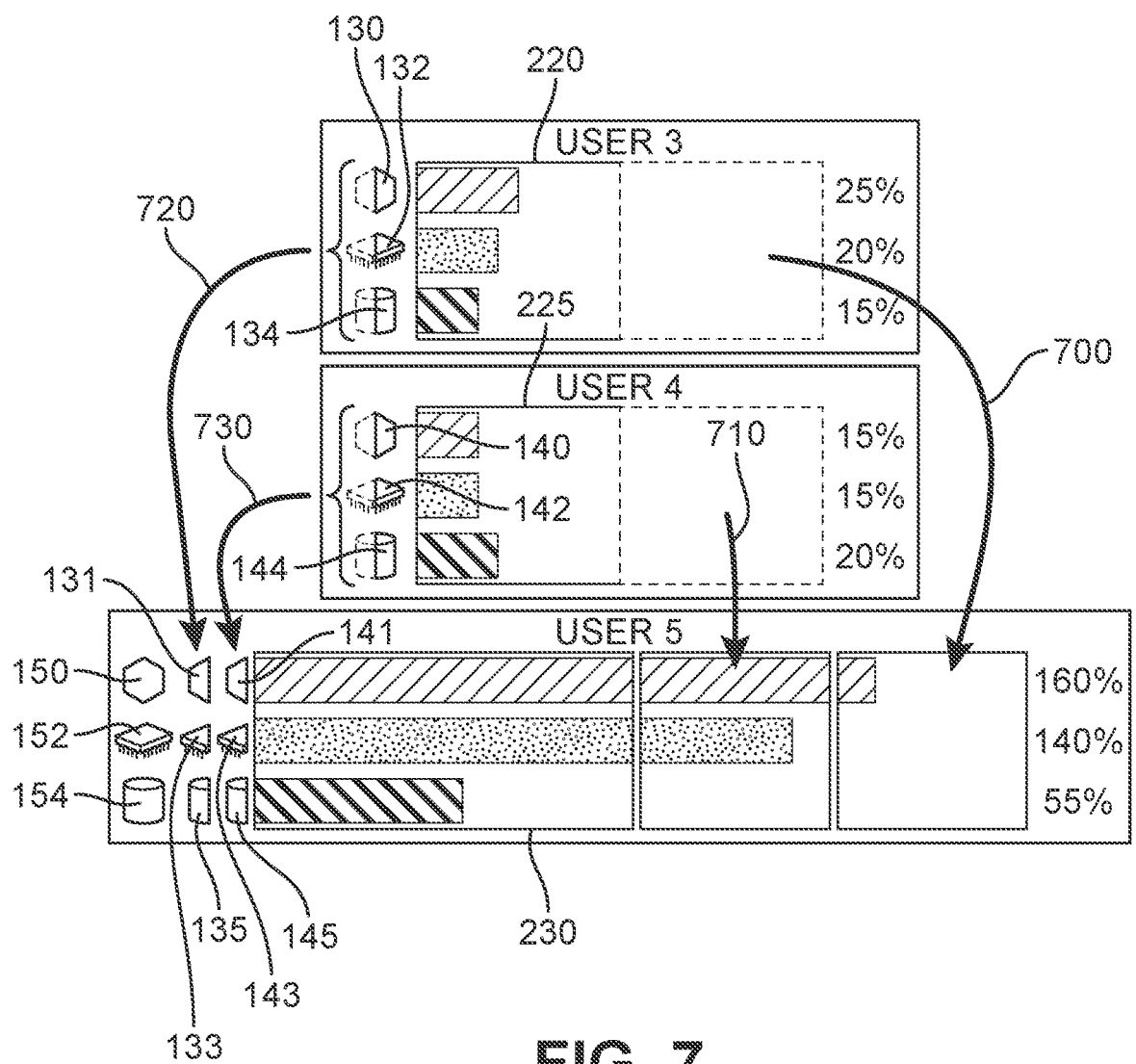
FIG. 7 and FIG. 8 are schematic diagrams of steps of another embodiment of the disclosure.
Figure 8:
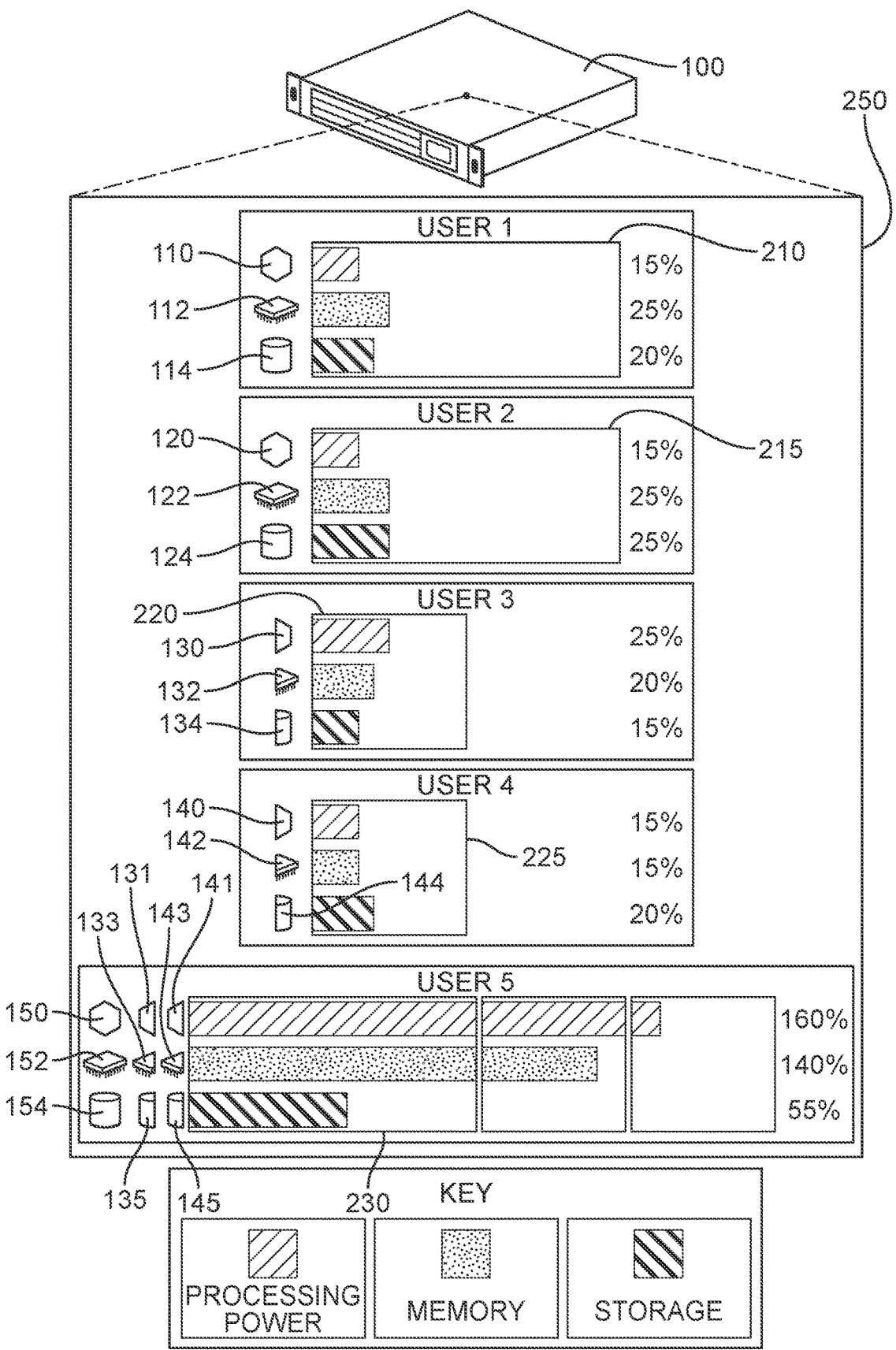

FIG. 7 and FIG. 8 illustrate yet another embodiment of the disclosure. FIG. 7 illustrates a portion of system 100 in FIG. 8. In system 100, the first predetermined threshold has been established at 80 percent, and the second predetermined threshold has been established at 25 percent. Thus, in this system, virtual computing machine 220 and virtual computing machine 225 are candidates for dynamic allocation of computing resources to other virtual computing machines. Virtual computing machine 230 is in need of a supplemental allocation of both processing core and memory resource, as demand for these computing resources in this virtual computing machine surely exceeds the first predetermined threshold.

In some embodiments, the disclosure is directed to a shared system for plural virtual computing machines. As illustrated in FIG. 7 and FIG. 8, system 100 includes virtual computing machine 210, virtual computing machine 215, virtual computing machine 220, virtual computing machine 225, and virtual computing machine 230.

Each virtual computing machine includes computing resources, typically in the form of a processing resource, a memory resource, and a storage resource. As illustrated in FIG. 7 and FIG. 8, first processor core 110 is found in virtual computing machine 210; second processor core 120 is found in virtual computing machine 215; third processing core 130 and fourth processing core 131 are found in virtual computing machine 220; fifth processing core 140 and sixth processing core 141 are found in virtual computing machine 225; seventh processor core 150 is found in virtual computing machine 230; and eighth processor core 160 is available in virtual computing machine 300.

Further, first memory resource 112 is found in virtual computing machine 210; second memory resource 122 is found in virtual computing machine 215; third memory resource 132 and fourth memory resource 133 are found in virtual computing machine 220; fifth memory resource 142 and sixth memory resource 143 found in virtual computing machine 225; and seventh memory resource 152 is found in virtual computing machine 230.

As also can be seen in FIG. 7 and FIG. 8, in these embodiments, first storage resource 114 is found in virtual computing machine 210; second storage resource 124 is found in virtual computing machine 215; third storage resource 134 and fourth storage resource 135 are found in virtual computing machine 220; fifth storage resource 144 and sixth storage resource 145 are found in virtual computing machine 225; and seventh storage resource 154 is found in virtual computing machine 230.

In system 100 depicted in FIG. 7 and FIG. 8, each computing resource for each virtual computing machine has an initial allocation. For example, processing core 110 has the same properties and characteristics as processing core 120. Further, the properties and characteristics of processing core 130 and processing core 131 are one-half those of processing core 120. In these embodiments, the allocations per virtual computing machine are equal. If any virtual computing machine has multiple units, such as 2 processing cores, the system monitors a current demand for each computing resource for each one of a plurality of virtual computing machines in the system to identify changes in the current demand.

In the embodiments of FIG. 7 and FIG. 8, virtual computing machine 230, assigned to USER5, is a virtual computing machine having use of the processing core computing resource that exceeds the first predetermined threshold of the first computing resource allotted, 80 percent, to the first virtual computing machine. However, virtual computing machine 225 and virtual computing machine 230 are operating at less than or equal to 25 percent, the second predetermined threshold, for each computing resource in each virtual computing machine.

In an embodiment, processing core 141, memory resource 143, and storage resource 145 are dynamically allocated to USER5 in virtual computing machine 230, as illustrated by movement arrow 710 and movement arrow 730. However, this allocation is not sufficient to provide the required operating capacity. Therefore, system 100 identifies a second virtual computing machine of the plurality of virtual computing machines for which usage of the first computing resource is less than a second predetermined threshold of the first computing resource allotted to the second virtual computing machine. In some embodiments, therefore, additional processing core 131, memory resource 133, and storage resource 135 are dynamically allocated to USER5 in virtual computing machine 230, as illustrated by movement arrow 700 and movement arrow 720. Thus, system 100 dynamically allocates a fraction of the first computing resource from the second virtual computing machine to the first virtual computing machine to meet the current demand for the first computing resource for the first machine.

In some embodiments, the allocations might have been first, from virtual computing machine 225, then virtual computing machine 220. The order in which two or more dynamic allocations are made may be related to whether it is likely that a return of a dynamically allocated resource is imminent or will be required before return allocation of the other dynamically allocated resources. The skilled practitioner will recognize how to make these dynamic allocations.

Server systems may be on or off, in accordance with whether the server is in use. The system could additionally have a middle state of on/ready, but not receiving traffic. In ready state, that it may remain at a low power consumption rate (idle) until it is determined that additional capacity is needed. When additional capacity is needed, the status may be changed from 'idle' to 'on,' at which point the time to add the capacity is perhaps a few seconds or less. Typically, the wait for a server to change from 'off' to 'on' may be between about 5 and about 45 minutes for a server to boot.

In some embodiments, all computing resources on a virtual computing machine may be dynamically allocated to another virtual computing machine, even if only 1 or 2 of the computing resources calls for dynamic allocation. For example, as illustrated for embodiments illustrated in FIG. 7 and FIG. 8, the first dynamic allocation of processing core 1 leaves a deficiency in memory resource 152. Therefore, in this embodiment, dynamic allocation of memory resource 133 is made. However, this allocation insufficient to satisfy the demand for memory resource for USER5 on virtual computing machine 230, so additional memory resource also is required. Thus, memory resource 143 is dynamically allocated to virtual computing machine 230.

In some embodiments, it may be necessary to ensure that a processing core is from the same memory channel/rank with memory resource to ensure that a specific block of a memory resource can be addressed. Therefore, in these embodiments, it may be necessary to shift a specific processing core allocation to ensure that a given memory resource address space can be allocated to a virtual computing machine.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for dynamically allocating computing resources to a plurality of virtual computing machines in a shared system, the method comprising the steps of:

determining an initial allocation for each computing resource for each virtual computing machine of the plurality of virtual computing machines;

monitoring a current demand for each computing resource for each one of the plurality of virtual computing machines to identify changes in the current demand;

identifying a first virtual computing machine of the plurality of virtual computing machines for which usage of a first computing resource is approaching a first predetermined threshold of the first computing resource allotted to a first user of the first virtual computing machine;

identifying a second virtual computing machine of the plurality of virtual computing machines in which a second user uses a portion of computing resources provided by the second virtual computing machine and a third virtual computing machine of the plurality of virtual computing machines in which a third user uses a portion of computing resources provided by the third virtual computing machine;

consolidating a computing resource usage for each computing resource of the second user and a computing resource usage for each computing resource of the third user into the second virtual computing machine by dynamically allocating computing resources from the second virtual computing machine and computing resources from the third virtual computing machine and then freeing computing resource usage of the third virtual computing machine; and dynamically allocating unused computing resources of the third virtual computing machine to the first user of the first virtual computing machine to satisfy a current demand for each computing resource by the first user in excess of resources provided by the first virtual computing machine;

wherein an order in which the computing resources from the second virtual computing machine and the computing resources from the third virtual computing machine are dynamically allocated is based on a likelihood that a return of a dynamically allocated resource will be required before return allocation of other dynamically allocated resources.

2. The method for dynamically allocating computing resources of claim 1, wherein the computing resource usage for each computing resource of the second user and the computing resource usage for each computing resource of the third user are provided using an available amount of each computing resource of the second virtual computing machine.

3. The method for dynamically allocating computing resources of claim 1, wherein the first computing resource is a processing resource.

4. The method for dynamically allocating computing resources of claim 1, wherein the first computing resource is a memory resource.

5. The method for dynamically allocating computing resources of claim 1, wherein the first computing resource is a storage resource.

6. The method for dynamically allocating computing resources of claim 1, wherein the second user and the third user share each computing resource of the second virtual machine.

7. A method for dynamically allocating computing resources to a plurality of virtual computing machines in a shared system, the method comprising the steps of:
determining an initial allocation for each computing resource for each virtual computing machine of the plurality of virtual computing machines;
monitoring a current demand for each computing resource for each one of the plurality of virtual computing machines to identify changes in the current demand;
identifying a first virtual computing machine of the plurality of virtual computing machines for which usage of a first computing resource is approaching a first predetermined threshold of the first computing resource allotted to the first virtual computing machine, wherein the first computing resource is a processing resource;
identifying a second virtual computing machine and a third virtual computing machine of the plurality of virtual computing machines for which usage of the first computing resource is less than a second predetermined threshold of the first computing resource allotted to the second virtual computing machine and the third virtual computing machine; and
dynamically allocating at least a part of the first computing resource from the second virtual computing machine and from the third virtual computing machine to the first virtual computing machine to meet the current demand for the first computing resource in the first virtual computing machine; and
wherein an order in which the first computing resource from the second virtual computing machine and the first computing resource from the third virtual computing machine are dynamically allocated is based on a likelihood that a return of a dynamically allocated resource will be required before a return allocation of another dynamically allocated resource.

8. The method for dynamically allocating computing resources of claim 7, wherein the first computing resource is an entire processing core.

9. The method for dynamically allocating computing resources of claim 7, wherein the first computing resource is a specific processing core and is from at least one of a same memory channel and a same memory rank corresponding to a given memory resource address.

10. The method for dynamically allocating computing resources of claim 7, wherein the dynamically allocating includes dynamically allocating available computing resources on the second virtual computing machine to the first virtual computing machine.

11. The method for dynamically allocating computing resources of claim 7, further comprising:
identifying a second computing resource for which usage by the first virtual computing machine of the second computing resource is approaching a first predetermined threshold of the second computing resource allotted to the first virtual computing machine, wherein the second computing resource is a memory resource; and
dynamically allocating at least a part of the second computing resource from the second virtual computing machine to the first virtual computing machine to meet a current demand for the second computing resource in the first virtual computing machine.

12. The method for dynamically allocating computer resources of claim 7, wherein the step of monitoring the current demand for each computing resource includes monitoring an amount of storage used by at least one of the plurality of virtual machines.

13. The method for dynamically allocating computer resources of claim 7, wherein the second predetermined threshold of the second computing resource is less than 30 percent.

14. The method for dynamically allocating computing resources of claim 7, wherein the step of monitoring the current demand for each computing resource includes monitoring an amount of memory used by at least one of the plurality of virtual machines.

15. A shared system for dynamically allocating computing resources to a plurality of virtual computing machines in the shared system, the shared system comprising:
at least one processor, configured to:

determine an initial allocation for each computing resource for each virtual computing machine of the plurality of virtual computing machines;

monitor a current demand for each computing resource for each one of the plurality of virtual computing machines in the system to identify changes in the current demand;

identify a first virtual computing machine of the plurality of virtual computing machines having usage of a first computing resource approaching a first predetermined threshold of the first computing resource allotted to the first virtual computing machine;

identify a second virtual computing machine of the plurality of virtual computing machines for which usage of the first computing resource is less than a second predetermined threshold of the first computing resource allotted to the second virtual computing machine; and dynamically allocate computing resources from the second virtual computing machine to the first virtual computing machine to meet the current demand for the first computing resource for the first virtual computing machine;

wherein computing resources are also dynamically allocated from a third virtual computing machine to meet the current demand for the first computing resource for the first virtual computing machine;

wherein an order in which the computing resources from the second virtual computing machine and the computing resources from the third virtual computing machine are dynamically allocated is based on a likelihood that a return of a dynamically allocated resource will be required before return allocation of other dynamically allocated resources.

16. The system of claim 15, wherein the likelihood that a return of a dynamically allocated resource will be required before return allocation of other dynamically allocated resources is determined based on monitoring demand for dynamically allocated resources.

17. The system of claim 15, wherein the first computing resource is a processing resource.

18. The system of claim 15, wherein the first computing resource is a memory resource.

19. The system of claim 15, wherein the first computing resource is a storage resource.

20. The system of claim 15, wherein a plurality of computing resources from a virtual computing machine are dynamically allocated together.

* * * * *